US 6,735,355 B2

(12) United States Patent
Wu et al.

(10) Patent No.: US 6,735,355 B2
(45) Date of Patent: May 11, 2004

(54) OPTICAL SWITCH HAVING A SEALING STRUCTURE

(75) Inventors: Kun-Tsan Wu, Tu-Chen (TW); Chien-Cheng Chen, Tu-Chen (TW)

(73) Assignee: Hon Hai Predcision Ind. Co., Ltd., Taipei Hsien (TW)

( * ) Notice: Subject to any disclaimer, the term of this patent is extended or adjusted under 35 U.S.C. 154(b) by 78 days.

(21) Appl. No.: 10/052,666

(22) Filed: Jan. 17, 2002

(65) Prior Publication Data

US 2003/0091269 A1 May 15, 2003

(30) Foreign Application Priority Data

Nov. 15, 2001 (TW) ........................................ 90219624 U

(51) Int. Cl.⁷ .................................................. G02B 6/35
(52) U.S. Cl. ............................. 385/18; 385/16; 385/147
(58) Field of Search ............................... 385/15–23, 25, 385/26, 31, 36, 88–94, 147

(56) References Cited

U.S. PATENT DOCUMENTS 6,502,999 B1 * 1/2003 Cohen et al. .................. 385/94
2003/0095740 A1 * 5/2003 Wu et al. ..................... 385/94

\* cited by examiner

*Primary Examiner*—John D. Lee
(74) *Attorney, Agent, or Firm*—Wei Te Chung

(57) ABSTRACT

An optical switch (1) having a sealing system connects to input fibers (42, 43) and output fibers (44, 45), and includes a switching device (5), a top housing (10), a bottom housing (30), a gasket (20) and four fiber clamps (40). The top and bottom housings each define a ringed channel (104, 304). The gasket is received in the ringed channels of the top and bottom housings. When screws combining the top and bottom housings together are tightened, the gasket deforms to fill the ringed channels, thereby forming a good seal between an inside and an outside of the housing.

10 Claims, 3 Drawing Sheets

OPTICAL SWITCH HAVING A SEALING STRUCTURE

BACKGROUND OF THE INVENTION

1. Field of the Invention

The present invention relates to an optical switch, and particularly to an optical switch having a sealing structure.

2. Description of Related Art

An optical switch is a passive optical component for switching optical signals between input fibers and output fibers, and is widely used in optical transmission systems and optical networks. To assure performance of the optical switch, the influence of the environment on the switch has to be reduced. Hence, a good sealing structure to protect the optical components in the switch is increasingly important.

The sealing structure must provide for stability and isolation of the components, so must exclude dust and vapor from the optical switch housing. Present sealing systems mainly use epoxy resin to mount fibers in two housings, and bind housing halves together using screws. These systems provide low isolation, allowing vapor and dust to enter the housing, degrading optical efficiency of the optical components.

For the above reasons, an improved sealing structure for optical switches is desired, which provides better stability and high isolation from the environment.

SUMMARY OF THE INVENTION

An object of the present invention is to provide an optical switch having an improved sealing structure.

Another object of the present invention is to provide a sealing structure for optical components which provides good stability and high isolation from the environment.

An optical switch having an improved sealing structure connects with input fibers and output fibers and comprises a switching device, a top housing, a bottom housing, an elastic gasket and a plurality of fiber clamps.

The top and bottom housings are similar in shape, and together have the shape of a bottle. Each housing separately defines a channel for receiving the gasket. The gasket defines at least one annular opening for receiving a fiber clamp holding optical fibers. The gasket is received in the channels of the top and bottom housings. When screws are tightened in screw holes to combine the housing halves together, the pressure deforms the gasket so that the channels are filled by the gasket. Thus, good isolation is provided to an interior of the housing.

A similar sealing system employing a top housing, a bottom housing, a gasket, and fiber clamps can be used to environmentally seal other optical components, such as optical couplers, optical connectors and optical attenuators.

Other objects, advantages and novel features of the invention will become more apparent from the following detailed description when taken in conjunction with the accompanying drawings.

DETAILED DESCRIPTION OF THE INVENTION

Figure 1:
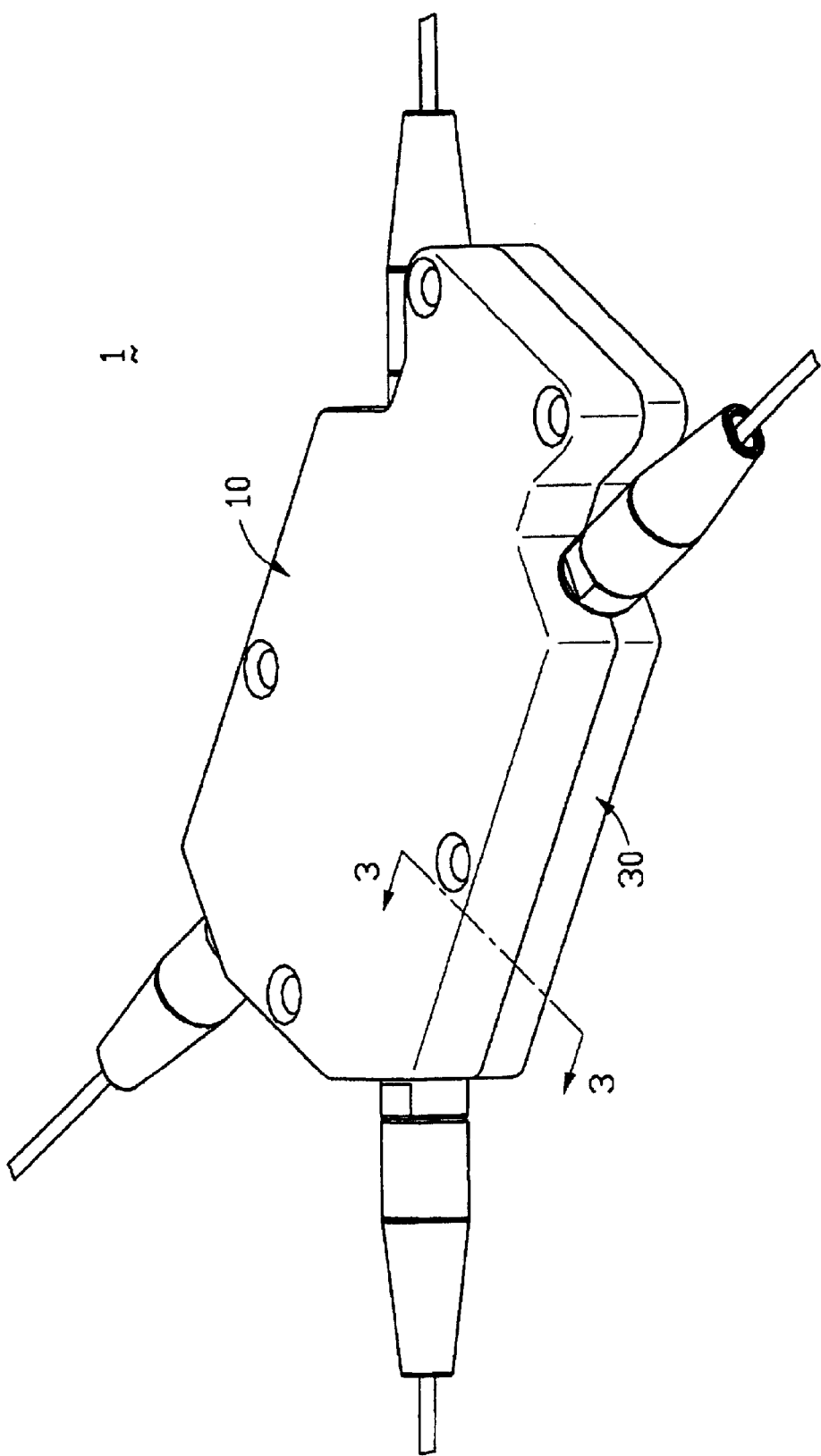
FIG. 1 is an assembled view of an optical switch having a sealing structure according to the present invention.
Figure 2:
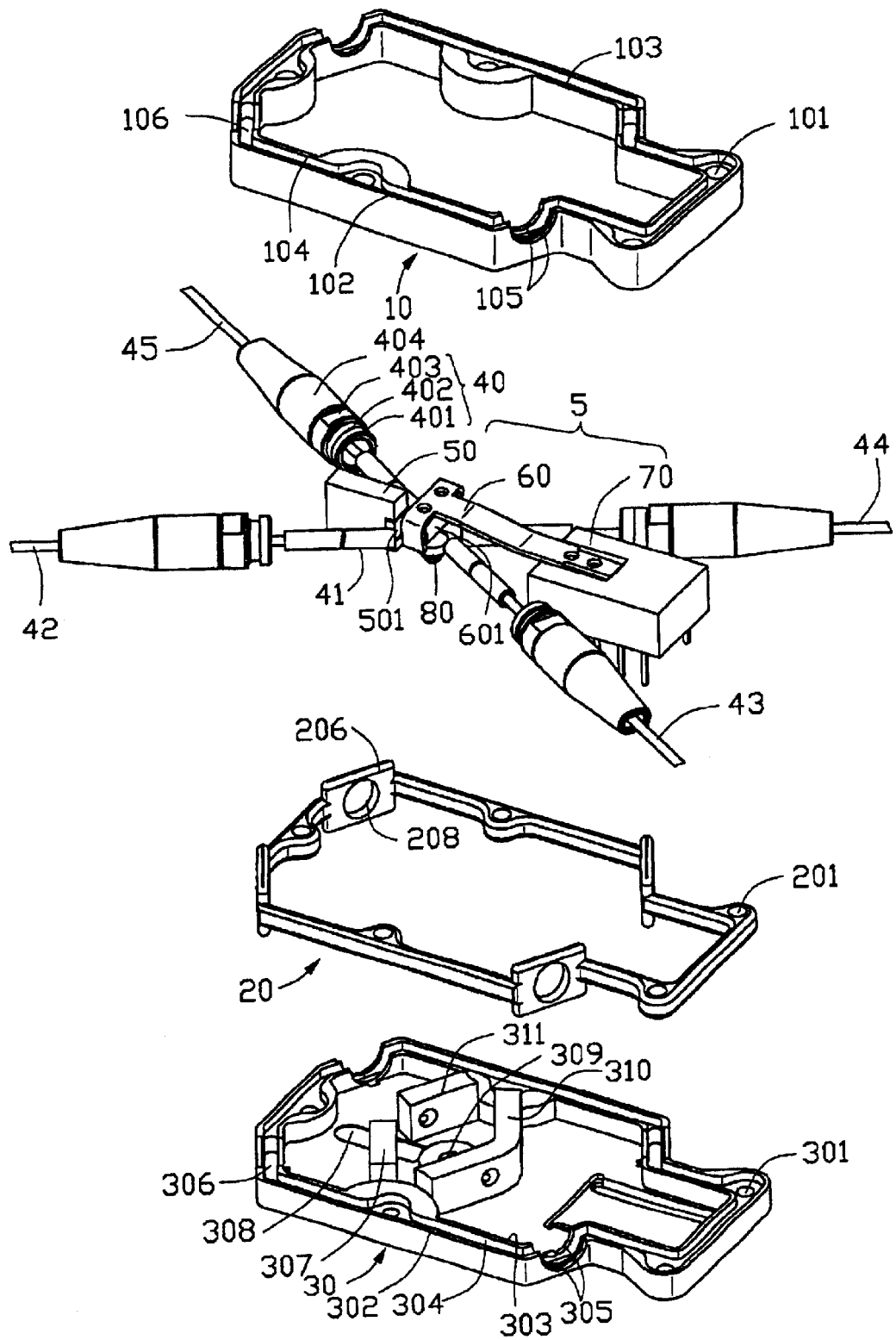
FIG. 2 is an exploded view of the optical switch of FIG. 1 with a top housing inverted for clarity.

As shown in FIGS. 1 and 2, an optical switch 1 for switching signals coming from input fibers 42, 43 between output fibers 44, 45 comprises a switching device 5, a top housing 10, a bottom housing 30, four fiber clamps 40, four collimators 41, four boots 404, and a gasket 20.

The top housing 10 and the bottom housing 30 are similar in shape, and together form roughly the shape of a bottle.

The top housing 10 (shown upside-down in FIG. 2) comprises an inner wall 103 and an outer wall 102 with a plurality of screw holes 101 defined therein. A ringed channel 104 is defined between the inner wall 103 and the outer wall 102. A pair of semi-annular openings 105 is defined in each of two lower sides and in each of two shoulders of the top housing 10. Each pair of semi-annular openings 105 is respectively defined in the inner wall 103 and in the outer wall 102, and a quadrate groove 106 is formed therebetween.

The bottom housing 30 includes an inner wall 303, an outer wall 302 and a plurality of screw holes 301. A ringed channel 304 is formed between the inner wall 303 and the outer wall 302. A pair of semi-annular openings 305 is defined in each of two lower sides and in each of two shoulders of the bottom housing 30. Each pair of semi-annular openings 305 is respectively defined in the inner wall 303 and in the outer wall 302, and a quadrate groove 306 is formed therebetween. The semi-annular openings 105 and the ringed channel 104 of the top housing 10 are similar to the semi-annular openings 305 and the ringed channel 304 of the bottom housing 30. The bottom housing 30 further comprises a slot 308, a mounting hole 309 and mounting walls 307, 310, 311.

The gasket 20 is substantially the same size and shape as the channels 104, 304 and is made of rubber or another elastic or ductile material. The gasket 20 comprises four quadrate flanges 206 for being received in the quadrate grooves 106, 306. Each quadrate flange 206 defines an annular opening 208 for inserting a fiber clamp 40 therethrough. A plurality of through holes 201 is defined in the gasket 20, placed to coincide with the screw holes 101, 301 of the top and bottom housings 10, 30.

The switching device 5 comprises a holding element 50, a reflector 501, a driving arm 60, a two-surface mirror 601 and a driving means 70. The holding element 50 holds the reflector 501 and is mounted in the slot 308 of the bottom housing 30. The two-surface mirror 601 is held and driven to move up and down by the driving arm 60. When the two-surface mirror 601 is displaced out of optical paths between the input fibers 42,43 and the output fibers 44,45, the light signals from the input fibers 42, 43 are respectively transmitted directly to the output fibers 44, 45. However, when the two-surface mirror 601 is moved into the optical paths, one surface of the two-surface mirror faces the reflector 501 and the two-surface mirror 601 reflects the light signals from the input fiber 42 to the reflector 501, and then the reflector 501 reflects the signals to the two-surface mirror 601, thereafter the two-surface mirror 601 reflects the signals to the output fiber 45; the signals from the input fiber 43 are reflected to the output fiber 44 by the two-surface mirror 601. The switching element 5 further comprises a stopper 80 received in the mounting hole 309 of the bottom housing 30. The stopper 80 is used to limit downward travel of the two-surface mirror 601. The driving means 70 drives the driving arm 60 to move the two-surface mirror 601 up and down.

The optical switch 1 further comprises four fiber clamps 40. Each fiber clamp 40 comprises a front flange 401, an annular groove 402 and a rear flange 403. Each fiber clamp 40 is inserted into a corresponding opening 208 of the gasket 20, and the annular groove 402 engages with the annular opening 208.

Figure 3:
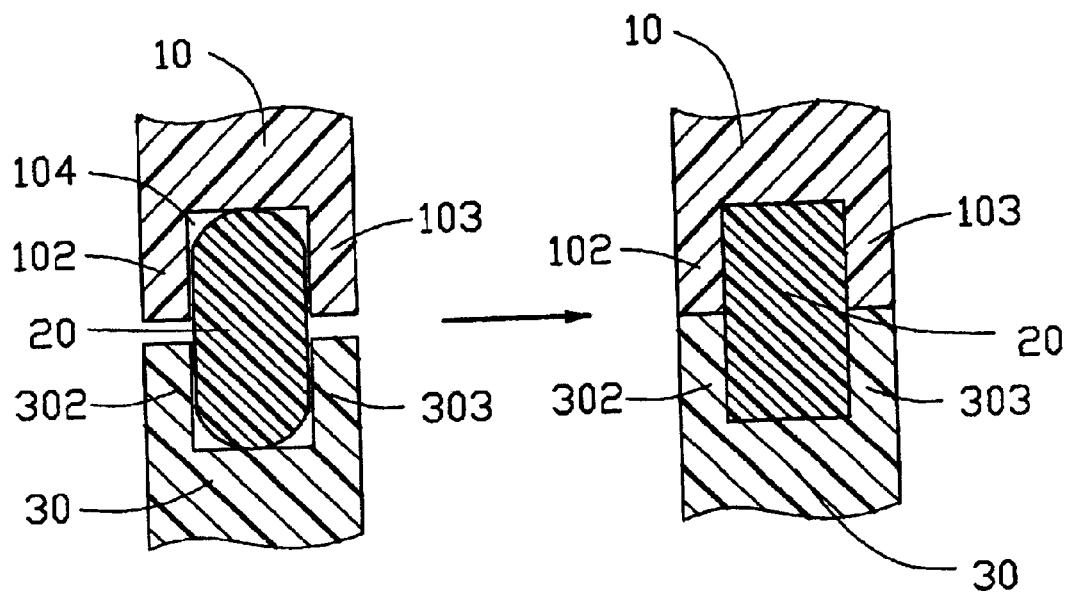
FIG. 3 is a cross-sectional view taken along the line 3—3 in FIG. 1.

In assembly, the switching device 5 is contained within an interior (not labeled) of the housing, formed by engagement of the top and bottom housings 10, 30 together. Four collimators 41 are separately mounted in the mounting walls 307, 310, 311 of the bottom housing 30 for collimating the signals. The input fibers 42, 43 and output fibers 44, 45 are each held in a corresponding fiber clamp 40 and boot 404. The fiber clamps 40 are insert into the openings 208 of the gasket 20. The annular groove 402 of each fiber clamp 40 engages with corresponding semi-annular openings 105, 305 in the top and bottom housings 10, 30 and with the opening 208 of the gasket 20. Referring to FIG. 3, the gasket 20 is received in the ringed channels 104, 304 and quadrate grooves 106, 306 of the top and bottom housings 10, 30. When screws (not shown) are threaded through the screw holes 101, 301 and through holes 201 and are tightened, the gasket 20 deforms under the pressure, filling the ringed channels 104, 304 and quadrate grooves 106, 306. The interior (not labeled) of the housing is thereby well sealed and protected from contamination from outside the housing.

The described sealing system, consisting of the top housing 10, the bottom housing 30, the gasket 20 and the fiber clamps 40 and boots 404, can be used to seal other optical components, such as optical couplers, optical connectors and optical attenuators.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical switch having a sealing structure and connected to at least one input fiber and at least one output fiber, comprising:

a top housing defining a ringed channel;

a bottom housing defining a ringed channel;

a switching device for switching signals between the at least one input fiber and the at least one output fiber; and a gasket defining at least one opening in a portion thereof for admitting an entrance of the at least one input fiber and the at least one output fiber;

wherein, when the first and second housings are engaged with each other, the gasket is situated in the ringed channels of the housings and the gasket other than said portion is deformed under the pressure of the engagement to fill the ringed channels of the top and bottom housings.

2. The optical switch having a sealing structure as claimed in claim 1, wherein the switching element comprises a driving arm holding a two-surface mirror, a holding element holding a reflector which is positioned opposite one surface of the two-surface mirror, and a driving means driving the two-surface mirror to move up and down.

3. The optical switch having a sealing structure as claimed in claim 1, wherein the top housing further comprises an inner wall and an outer wall, and the ringed channel is defined therebetween.

4. The optical switch having a sealing structure as claimed in claim 3, wherein the bottom housing further comprises an inner wall and an outer wall, and the ringed channel is defined therebetween.

5. The optical switch having a sealing structure as claimed in claim 4, wherein at least two semi-annular openings are respectively defined in the inner and outer walls of the top and bottom housings for entrance of the at least one input fiber and the at least one output fiber.

6. The optical switch having a sealing structure as claimed in claim 5, further comprising a fiber clamp for each fiber for holding the fiber therein.

7. The optical switch having a sealing structure as claimed in claim 6, wherein the fiber clamps each comprises a front flange, an annular groove and a rear flange, the annular groove of each fiber clamp engages with a corresponding opening of the gasket and with two corresponding semi-annular openings of each of the top and bottom housings.

8. The optical switch having a sealing structure as claimed in claim 5, wherein the gasket further comprises a quadrate flange, the at least one opening being defined in the quadrate flange.

9. The optical switch having a sealing structure as claimed in claim 8, wherein a quadrate groove for receiving the quadrate flange is formed between each pair of semi-annular openings in each of the top and bottom housings.

10. The optical switch having a scaling structure as claimed in claim 1, wherein the top housing and the bottom housing respectively comprise a plurality of screw holes, and the gasket comprises a plurality of through holes corresponding to the screw holes.

* * * * *